United States Patent
Onaizi et al.

(10) Patent No.: US 12,129,431 B1
(45) Date of Patent: Oct. 29, 2024

(54) REMOVING HYDROGEN SULFIDE FROM SUBTERRANEAN GEOLOGICAL FORMATION WITH A COPPER MAGNESIUM IRON LAYERED TRIPLE HYDROXIDE ZEOLITE MATERIAL IN A WATER-BASED DRILLING FLUID

(71) Applicant: KING FAHD UNIVERSITY OF PETROLEUM AND MINERALS, Dhahran (SA)

(72) Inventors: Sagheer A. Onaizi, Dhahran (SA); Mustapha Iddrisu, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 0 days.

(21) Appl. No.: 18/763,303

(22) Filed: Jul. 3, 2024

(51) Int. Cl.
*C09K 8/54* (2006.01)
*C09K 8/16* (2006.01)
(Continued)

(52) U.S. Cl.
CPC ............... *C09K 8/54* (2013.01); *C09K 8/16* (2013.01); *C09K 8/206* (2013.01); *C09K 8/22* (2013.01);
(Continued)

(58) Field of Classification Search
CPC . C09K 8/16; C09K 8/54; C09K 8/206; C09K 8/22; C09K 8/03; C09K 8/04;
(Continued)

(56) References Cited

U.S. PATENT DOCUMENTS

| 10,041,300 B2 | 8/2018 | Maghrabi et al. |
| 2017/0081580 A1* | 3/2017 | Maghrabi ................ C09K 8/36 |

(Continued)

FOREIGN PATENT DOCUMENTS

| CN | 103464107 A | * 12/2013 |
| CN | 115406937 A | * 11/2022 |

(Continued)

OTHER PUBLICATIONS

Onaizi, Investigation of the Rheology, Filtration Loss, and H2S Scavenging Performance of Zeolitic-Imidazole Framework-67 (ZIF-67) and Layered Metal Hydroxide (LTH) Nanomaterials for Oilfield Drilling Applications, retrieved from https://eprints.kfupm.edu.sa/id/eprint/142712/, Jan. 3, 2024 (Year: 2024).*

(Continued)

*Primary Examiner* — Angela M DiTrani Leff
(74) *Attorney, Agent, or Firm* — Oblon, McClelland, Maier & Neustadt, L.L.P.

(57) ABSTRACT

A method of removing hydrogen sulfide ($H_2S$) from a subterranean geological formation using a nanocomposite material includes injecting a drilling fluid suspension with a (Continued)

pH of 10 or more containing a nanocomposite material in an amount of 0.01 to 1.5 percent by weight of the drilling fluid suspension into the subterranean geological formation. The nanocomposite material is a layered triple hydroxide material including copper, magnesium, iron, and a zeolitic imidazolate framework-67. The method further includes circulating the drilling fluid suspension in the subterranean geological formation and forming a water-based mud and scavenging the hydrogen sulfide from the subterranean geological formation by reacting the hydrogen sulfide with the nanocomposite material in the water-based mud.

20 Claims, 6 Drawing Sheets

(51) Int. Cl.
  *C09K 8/20* (2006.01)
  *C09K 8/22* (2006.01)
  *E21B 21/00* (2006.01)
(52) U.S. Cl.
  CPC ........ *E21B 21/003* (2013.01); *C09K 2208/10* (2013.01); *C09K 2208/20* (2013.01)
(58) Field of Classification Search
  CPC ...... C09K 8/52; C09K 8/532; C09K 2208/10; C09K 2208/20; E21B 21/003; E21B 41/02
  See application file for complete search history.

(56) References Cited

U.S. PATENT DOCUMENTS

| | | | | |
|---|---|---|---|---|
| 2020/0190394 | A1* | 6/2020 | Moorhouse | C09K 8/536 |
| 2023/0045845 | A1* | 2/2023 | Ben-Zvi | E21B 43/2406 |
| 2024/0117238 | A1* | 4/2024 | Tomson | C09K 8/035 |
| 2024/0198273 | A1* | 6/2024 | Onaizi | B01J 20/28066 |

FOREIGN PATENT DOCUMENTS

| | | | |
|---|---|---|---|
| CN | 115845821 B | 8/2023 | |
| JP | 2005263596 A * | 9/2005 | |
| WO | WO-2007041553 A1 * | 4/2007 | B01D 15/00 |
| WO | 2019/069133 A1 | 4/2019 | |

OTHER PUBLICATIONS

Translation of JP-2005263596-A (Year: 2005).*
Translation of CN-115406937-A (Year: 2022).*
Translation of CN-103464107-A (Year: 2013).*
Iddrisu et al. ; H2S scavenging performance and rheological properties of water-based drilling fluids comprising ZIF-67 ; Geoenergy Science and Engineering, vol. 228 ; Jun. 15, 2023 ; 4 Pages.
Zhang et al. ; Multi-Mixed Metal Hydroxide as a Strong Stratigraphic Nanoclay Inhibitor in Solid-Free Drilling Fluid ; MDPI nanomaterials, 12 ; Nov. 1, 2022 ; 16 Pages.
Vennapoosa et al. ; S-Scheme ZIF-67/CuFe-LDH Heterojunction for High-Performance Photocatalytic H2 Evolution and CO2 to MeOH Production ; Inorg. Chem. 62, 40 ; Sep. 22, 2023 ; Abstract Only ; 2 Pages.
Guo et al. ; Synthesis of mesoporous Cu/Mg/Fe layered double hydroxide and its adsorption performance for arsenate in aqueous solutions, vol. 25, Issue 5 ; May 14, 2013 ; Abstract Only ; 1 Page.

* cited by examiner

REMOVING HYDROGEN SULFIDE FROM SUBTERRANEAN GEOLOGICAL FORMATION WITH A COPPER MAGNESIUM IRON LAYERED TRIPLE HYDROXIDE ZEOLITE MATERIAL IN A WATER-BASED DRILLING FLUID

STATEMENT OF ACKNOWLEDGEMENT

Support provided by the Deanship of Research Oversight and Coordination (DROC), King Fahd University of Petroleum and Minerals, Saudi Arabia through project number DF191027 is gratefully acknowledged.

BACKGROUND

Technical Field

The present disclosure is directed towards scavenging hydrogen sulfide ($H_2S$) in aqueous drilling operations, and more particularly, directed towards a method of removing $H_2S$ from a subterranean geological formation with a copper, magnesium, and iron layered triple hydroxide zeolite material.

Description of Related Art

The "background" description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hydrogen sulfide ($H_2S$) is generated locally in gas and oil reservoirs by thermochemical reduction of sulfate by hydrocarbon microorganisms and/or indigenous microorganisms, such as sulfate-reducing bacteria, under anaerobic conditions. Thus, several crude oil and gas reservoirs contain $H_2S$. The exposure to $H_2S$ creates several challenges and raises safety concerns during the drilling of subterranean surfaces. Further, $H_2S$ is a toxic and highly corrosive gas. $H_2S$ is poisonous to humans and animals and may be lethal at levels as low as 350 ppm within a short exposure time. The corrosive nature of $H_2S$ causes damage to metallic structures and equipment utilized in drilling operations, resulting in several operational problems, such as interference with the downhole tools, including artificial lift equipment. $H_2S$ may cause a loss in water injection wells and diminish well productivity due to the blockage of the wellbore. $H_2S$ is highly reactive and may decrease the lifespan of polymers and starches used to enhance the rheology of aqueous drilling fluids. To mitigate and/or elimate health and operational issues of hydrogen sulfide, scavenging $H_2S$ during oil and gas drilling operations is encouraged.

Numerous techniques and compositions have been proposed for scavenging $H_2S$ from water-based drilling fluids during oil and gas drilling operations. U.S. Pat. No. 4,473,115A discloses a stabilized solution of chlorine dioxide ($ClO_2$) for the reduction of $H_2S$ present in drilling fluids. The disclosed scavenger was prepared by stabilizing the chlorine dioxide gas in an aqueous solution with alkali metal salts, including carbonates, bicarbonates, sulfates, borates, and phosphates, and an active oxygen source including ozone ($O_3$), hydrogen peroxide ($H_2O_2$), urea peroxide, and the like. U.S. Pat. No. 4,548,720A discloses a method for removal of HIS during drilling of subterranean formations using powdered solid oxidants, such as calcium hypochlorite ($Ca(OCl)_2$), sodium perborate ($NaBO_3$), potassium peroxydisulfate ($K_2S_2O_8$), and potassium permanganate ($KMnO_4$). U.S. Pat. No. 4,756,836A discloses iron (Fe) chelates drilling fluid additive composed of a preferred chelating agent such as EDTA, HEDTA, NTA, or DTPA, which may regenerate oxygen for removal of $H_2S$. The iron chelate scavenger reacts with $H_2S$ to liberate elemental sulfur. U.S. Pat. No. 6,365,053B1 discloses a sparingly soluble Fe(II) salt for the removal of $H_2S$ in both oil and aqueous drilling fluids during circulation. The preferred scavenger was an iron oxalate, which reacts with $H_2S$ to produce iron sulfide. U.S. Pat. No. 6,746,611B2 discloses a method and composition for removing $H_2S$ at a pH of at least 11 from drilling fluids during the drilling of subterranean formations. The composition includes a ferrous gluconate which reacts with $H_2S$ to produce iron sulfide precipitate. U.S. Pat. No. 9,254,453B2 discloses a composition including a gluconate salt other than iron gluconate and a method where the scavenger is added to the drilling fluid along with an iron precursor if the fluid does not already contain iron ions. The iron precursor or iron ions present in the fluid reacts with gluconate salt within the drilling fluid to produce iron gluconate, which further reacts with $H_2S$ to precipitate iron sulfide and gluconic acid. The gluconic acid further reacts with iron to produce iron gluconate, which again reacts with $H_2S$. U.S. Pat. No. 9,587,181B2 discloses a method and composition that includes a transition metal salt and a water-soluble aldehyde-based precursor for scavenging $H_2S$ from aqueous fluids. The composition contains zinc or iron carboxylates as the transition metal salt and ethylene glycol hemiformal as the water-soluble aldehyde precursor.

Although several water-based drilling fluids have been used in the past for scavenging hydrogen sulfide from subterranean geological formations, the above-mentioned methods may be inefficient, detrimental to the environment, and/or financially taxing. Thus, there arises a need for better techniques to scavenge $H_2S$ from subterranean geological formations. Accordingly, an object of the present disclosure to provide a method of removing $H_2S$ from a subterranean geological formation with a copper magnesium iron layered triple hydroxide zeolite mater in an aqueous drilling fluid suspension that may overcome the aforementioned drawbacks.

SUMMARY

In an exemplary embodiment, a method of removing hydrogen sulfide ($H_2S$) from a subterranean geological formation is described. The method includes injecting a drilling fluid suspension into the subterranean geological formation. The drilling fluid suspension includes a nanocomposite material including a layered triple hydroxide material including copper, magnesium, iron, and a zeolitic imidazolate framework-67. The drilling fluid suspension has a pH of 10 or more. The nanocomposite material is present in an amount of 0.01 to 1.5 percent by weight (wt. %) of the drilling fluid suspension. The method further includes circulating the drilling fluid suspension in the subterranean geological formation, forming a water-based mud, and scavenging the hydrogen sulfide from the subterranean geological formation by reacting the hydrogen sulfide with the nanocomposite material in the water-based mud.

In some embodiments, a molar ratio of copper to magnesium to iron is 1-3:0.5-2:0.5-2 in the layered triple hydroxide material.

In some embodiments, the drilling fluid suspension further includes a bentonite, a polysaccharide, a starch, a hydroxide, and a carbonate.

In some embodiments, a breakthrough time for the hydrogen sulfide in the presence of the drilling fluid suspension is 25 to 35 times greater compared to a breakthrough time for the hydrogen sulfide in the presence of the drilling fluid suspension without the nanocomposite material.

In some embodiments, a saturation time for the hydrogen sulfide in the presence of the drilling fluid suspension is 2 to 8 times greater compared to a saturation time for the hydrogen sulfide in the presence of the drilling fluid suspension without the nanocomposite material.

In some embodiments, a breakthrough capacity for the hydrogen sulfide in the presence of the drilling fluid suspension is at least 25 to 35 times greater than a breakthrough capacity for the hydrogen sulfide in the presence of the drilling fluid suspension without the nanocomposite material.

In some embodiments, a saturation capacity for the hydrogen sulfide in the presence of the drilling fluid suspension is at least 5 to 10 times greater than a saturation capacity for the hydrogen sulfide in the presence of the drilling fluid suspension without the nanocomposite material.

In some embodiments, a plastic viscosity of the drilling fluid suspension is 1 to 2 times greater compared to a plastic viscosity of the drilling fluid suspension without the nanocomposite material.

In some embodiments, an apparent viscosity of the drilling fluid suspension is 1 to 2.5 times greater compared to an apparent viscosity of the drilling fluid suspension without the nanocomposite material.

In some embodiments, a yield point of the drilling fluid suspension is 1 to 4 times greater compared to a yield point of the drilling fluid suspension without the nanocomposite material.

In some embodiments, a carrying capacity of the drilling fluid suspension is 1 to 2 times greater compared to a carrying capacity of the drilling fluid suspension without the nanocomposite material.

In some embodiments, a fluid loss of the drilling fluid suspension is 1 to 1.2 times greater compared to a fluid loss of the drilling fluid suspension without the nanocomposite material.

In some embodiments, a gel strength of the drilling fluid suspension at a time of 10 seconds is 1 to 8 times greater compared to a yield point of the drilling fluid suspension without the nanocomposite material at a time of 10 seconds.

In some embodiments, a gel strength of the drilling fluid suspension at a time of 10 minutes is 1.1 to 6 times greater compared to a yield point of the drilling fluid suspension without the nanocomposite material at a time of 10 minutes.

In some embodiments, the drilling fluid suspension has a density of 2 to 20 parts per gram (ppg).

In another exemplary embodiment, a method of making the nanocomposite material is described. The method includes dissolving a copper salt, a magnesium salt, and an iron salt in water to form a metallic solution, dissolving a base and a carbonate salt in water to form an alkali solution, adding dropwise the metallic solution and the alkali solution to water, stirring to form a first solution, and stirring the first solution for 20 to 40 minutes to form a layered triple hydroxide product. Furthermore, the method includes treating the layered triple hydroxide product hydrothermally at 140° C. to 160° C. for 20 to 30 hours followed by drying the layered triple hydroxide product at 60° C. to 100° C. Next, the method includes dispersing the layered triple hydroxide in water with a cobalt salt to form a second solution, dissolving 2-methyl imidazole in an ammonia solution, and mixing the second solution and the ammonia solution to form the nanocomposite material.

In some embodiments, a weight ratio of the layered triple hydroxide material and the zeolitic imidazolate framework-67 in the nanocomposite material is from 1:10 to 10:1.

In some embodiments, the method of scavenging the hydrogen sulfide from the subterranean geological formation includes bonding the hydrogen sulfide to the nanocomposite material.

In some embodiments, the method further includes flowing hydrogen sulfide gas into the drilling fluid suspension.

In some embodiments, the flowing of hydrogen sulfide gas into the drilling fluid suspension occurs at a rate of 50 to 150 mL/minute.

These and other aspects of the non-limiting limiting embodiments of the present disclosure will become apparent to those skilled in the art upon review of the following description of specific non-limiting embodiments of the disclosure in conjunction with the accompanying drawings. The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure (including alternatives and/or variations thereof) and many of the attendant advantages thereof will be readily obtained as the same becomes better understood by reference to the following detailed description when considered in connection with the accompanying drawings, wherein.

DETAILED DESCRIPTION

Figure 1A:
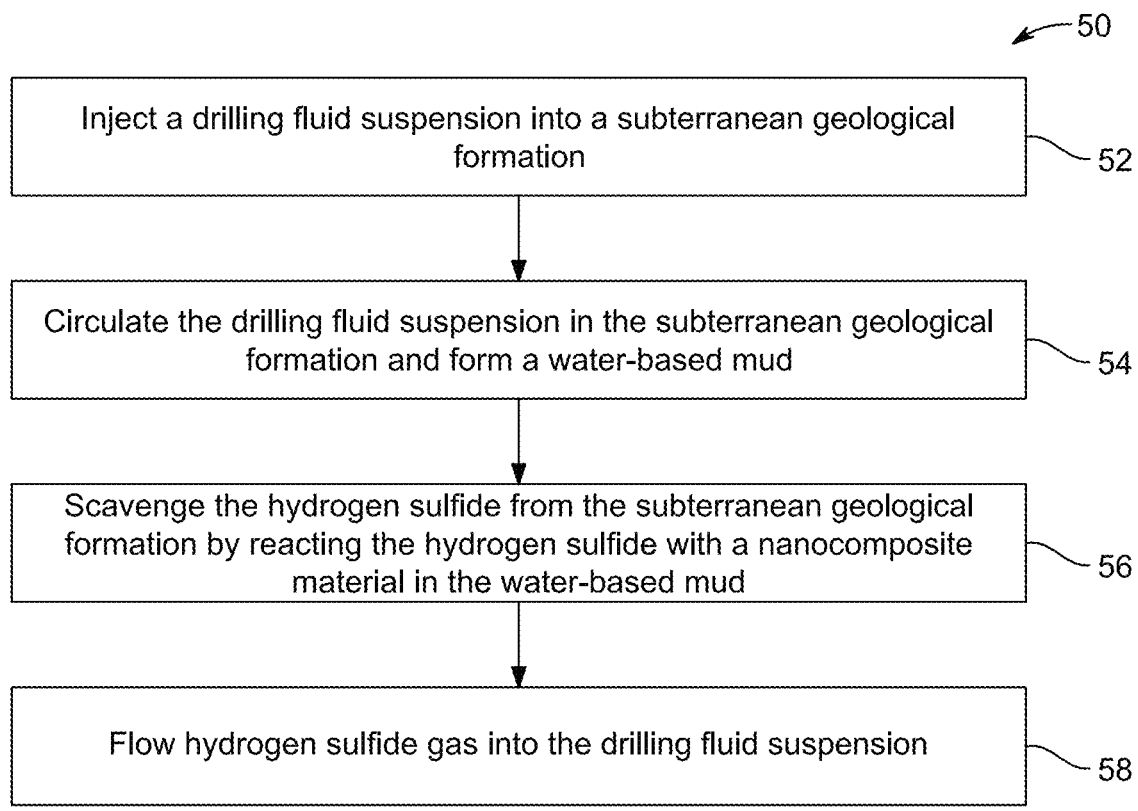
FIG. 1A is a flowchart illustrating a method of removing hydrogen sulfide from a subterranean geological formation, according to certain embodiments.

In the following description, it is understood that other embodiments may be utilized, and structural and operational changes may be made without departure from the scope of the present embodiments disclosed herein.

Reference will now be made to specific embodiments or features, examples of which are illustrated in the accompanying drawings. In the drawings, whenever possible, corresponding or similar reference numerals will be used to designate identical or corresponding parts throughout the several views. Moreover, references to various elements described herein are made collectively or individually when there may be more than one element of the same type.

However, such references are merely exemplary in nature. It may be noted that any reference to elements in the singular may also be constructed to relate to the plural and vice-versa without limiting the scope of the disclosure to the exact number or type of such elements unless set forth explicitly in the appended claims. Further, as used herein, the words "a," "an," and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the words "a" and "an" and the like carry the meaning of "one or more." Within the description of this disclosure, where a numerical limit or range is stated, the endpoints are included unless stated otherwise. Also, all values and subranges within a numerical limit or range are specifically included as if explicitly written out.

As used herein, the term "zeolitic material," "zeolitic framework," or zeolitic imidazole framework" refers to a material having the crystalline structure or three-dimensional framework of, but not necessarily the elemental composition of, a zeolite. Zeolites are porous silicate or aluminosilicate minerals that occur in nature. Elementary building units of zeolites are $SiO_4$ (and, if appropriate, $AlO_4$) tetrahedra. Adjacent tetrahedra are linked at their corners via a common oxygen atom, which results in an inorganic macromolecule with a three-dimensional framework (frequently referred to as the zeolite framework). The three-dimensional framework of a zeolite also includes channels, channel intersections, and/or cages having dimensions in the range of 0.1-10 nanometers (nm), preferably 0.2-5 nm, and more preferably 0.2-2 nm. Water molecules may be present inside these channels, channel intersections, and/or cages. Zeolites that are devoid of aluminum may be referred to as "all-silica zeolites" or "aluminum-free zeolites." Some zeolites which are substantially free of, but not devoid of, aluminum are referred to as "high-silica zeolites." Sometimes the term "zeolite" is used to refer exclusively to aluminosilicate materials, excluding aluminum-free zeolites or all-silica zeolites.

In some embodiments, the zeolitic material has a three-dimensional framework that is at least one zeolite framework selected from the group consisting of a 4-membered ring zeolite framework, a 6-membered ring zeolite framework, a 10-membered ring zeolite framework, and a 12-membered ring zeolite framework. The zeolite may have a natrolite framework (e.g. gonnardite, natrolite, mesolite, paranatrolite, scolecite, and tetranatrolite), edingtonite framework (e.g. edingtonite and kalborsite), thomsonite framework, analcime framework (e.g. analcime, leucite, pollucite, and wairakite), phillipsite framework (e.g. harmotome), gismondine framework (e.g. amicite, gismondine, garronite, and gobbinsite), chabazite framework (e.g. chabazite-series, herschelite, willhendersonite, and SSZ-13), faujasite framework (e.g. faujasite-series, Linde type X, and Linde type Y), mordenite framework (e.g. maricopaite and mordenite), heulandite framework (e.g. clinoptilolite and heulandite-series), stilbite framework (e.g. barrerite, stellerite, and stilbite-series), brewsterite framework, cowlesite framework, and the like.

Aspects of the present disclosure pertain to a nanocomposite, including layered triple hydroxide material comprising copper, magnesium, and iron, and a zeolitic imidazolate framework-67 (CuMgFe-LTH/ZIF-67). The nanocomposite was used in drilling fluid formulations and was evaluated for its potential to remove hydrogen sulfide ($H_2S$) in oil and gas drilling operations. The results indicate the drilling fluid formulation with the nanocomposite showed no detectable traces of $H_2S$ until the breakthrough time, which was approximately 1011.5 minutes. The nanocomposite also demonstrated better rheological properties and improved the performance of the drilling fluid formulation, leading to smoother drilling operations.

FIG. 1A illustrates a flow chart of a method 50 for removing hydrogen sulfide from a subterranean geological formation. The order in which the method 50 is described is not intended to be construed as a limitation, and any number of the described method steps can be combined in any order to implement the method 50. Additionally, individual steps may be removed or skipped from the method 50 without departing from the spirit and scope of the present disclosure. The subterranean geological formation may include, but is not limited to, a depleted oil reservoir, a depleted gas reservoir, a sour reservoir, a hydrocarbon-bearing subterranean formation, a saline formation, an un-minable coal bed, and the like. In some embodiments, the method 50 may remove hydrogen sulfide from mixed production systems, produced water from an oil field, and the like. Typically, the subterranean geological formation is accessed through a borehole or wellbore drilled through overlying geological strata that may isolate or seal the subterranean geological formation from the surface of the earth. The subterranean geological formation is preferably at a depth of at least 250 meters, preferably at least 500 meters, or preferably at least 1,000 meters below the surface of the earth.

At step 52, the method 50 includes injecting a drilling fluid suspension (also referred to as an aqueous drilling fluid) into the subterranean geological formation. In some embodiments, the drilling fluid is injected into the subterranean geological formation through a wellbore, e.g., through tubing connected to a supply source of the drilling fluid suspension located on the surface. In some embodiments, driving a drill bit to form a wellbore in the subterranean geological formation may lead to the production of a formation fluid. In some embodiments, the formation fluid may be a sour gas and/or a sour crude oil. Sour gas is a natural gas, including an amount of hydrogen sulfide. In some embodiments, the formation fluid may include, but are not limited to, natural gas (i.e., majority methane), hydrocarbon or non-hydrocarbon gases (including condensable and non-condensable gases), light hydrocarbon liquids, heavy hydrocarbon liquids, rock, oil shale, bitumen, oil sands, tar, coal, and/or water, the like, and a combination thereof. Further, the non-condensable gases may include but are not limited to, hydrogen, carbon monoxide, carbon dioxide, methane, and the like. In some other embodiments, the formation fluid may be in the form of a gaseous fluid, a liquid, or a double-phase fluid. In some embodiments, the formation fluid includes hydrogen sulfide. Microorganisms, such as sulfate-reducing bacteria, may generate hydrogen sulfide in gas and oil reservoirs. In some embodiments, some other method used or known in the art may lead to the formation of hydrogen sulfide in the wellbore. The subterranean geological formation includes one or more hydrocarbons similar to the hydrocarbons present in the formation fluid.

The drilling fluid suspension includes a nanocomposite material/scavenger. The nanocomposite material is a layered triple hydroxide (LTH) material, including copper, magnesium, and iron, and a zeolitic imidazolate framework-67 (ZIF-67). Layered triple hydroxides are part of a more general group of layered hydroxides. Layered hydroxides are a class of ionic solids characterized by a layered structure with the generic layer sequence [AcBZAcB]$_n$, where c represents layers of metal cations, A and B are layers of hydroxide (HO$^-$) anions, and Z are layers of other anions and neutral molecules (such as water). Lateral offsets between the layers may result in longer repeating periods. Layered hydroxides can be seen as derived from hydroxides of divalent cations with the brucite layer structure [Ad-BAdB]$_n$, by oxidation or cation replacement in the metal layers (d), so as to give them an excess positive electric charge; and intercalation of extra anion layers (Z) between the hydroxide layers (A,B) to neutralize that charge, resulting in the structure [AcBZAcB]$_n$. Layered hydroxides may be formed with a wide variety of anions in the intercalated layers (Z), such as dodecyl sulfate (DDS) (CH$_3$(CH$_2$)$_{11}$OSO$_3^-$), Cl$^-$, Br$^-$, nitrate (NO$_3^-$), carbonate (CO$_3^{2-}$), SO$_4^{2-}$, acetate (C$_2$H$_3$O$_2^-$), SeO$_4^{2-}$, and combinations thereof. The size and properties of the intercalated anions may have an effect on the spacing of the layers, known as the basal spacing.

A layered hydroxide may be a synthetic or a naturally occurring layered hydroxide. Naturally-occurring layered hydroxides include those in the Hydrotalcite Group (hydrotalcite, pyroaurite, stichtite, meixnerite, iowaite, droninoite, woodallite, desautelsite, takovite, reevesite, or jamborite), the Quintinite Group (quintinite, charmarite, caresite, zaccagnaite, chlormagaluminite, or comblainite), the Fougerite group (fougerite, trbeurdenite, or mossbauerite), the Woodwardite Group (woodwardite, zincowoodwardite, or honessite), the Glaucocerinite Group (glaucocerinite, hydrowoodwardite, carrboydite, hydrohonessite, mountkeithite, or zincaluminite), the Wermlandite Group (wermlandite, shigaite, nikischerite, motukoreaite, natroglaucocerinite, or karchevskyite), the Cualstibite Group (cualstibite, zincalstibite, or omsite), the Hydrocalumite Group (hydrocalumite or kuzelite), or may be an unclassified layered hydroxide, such as coalingite, brugnatellite, or muskoxite.

In preferred embodiments, the layered hydroxide has a positive layer (c) which contains both divalent and trivalent cations. In an embodiment, the divalent ion is at least one selected from the group consisting of M$^{2+}$ is Ca$^{2+}$, Mg$^{2+}$, Mn$^{2+}$, Fe$^{2+}$, Cu$^{2+}$, Ni$^{2+}$, Cu$^{2+}$, and Zn$^{2+}$. In an embodiment, the trivalent ion is at least one selected from the group consisting of M$^{3+}$ is Al$^{3+}$ Mn$^{3+}$, Cr$^{3+}$, Fe$^{3+}$, Sc$^{3+}$, Ga$^{3+}$, La$^{3+}$, V$^{3+}$, Sb$^{3+}$, Y$^{3+}$, In$^{3+}$, Co$^{3+}$ and/or Ni$^{3+}$. In a preferred embodiment, the layered triple hydroxide (LTH) contains two divalent cations and one trivalent cation and has a layered structure. In a most preferred embodiment, the LTH is a CuMgFe-LTH.

In some embodiments, a molar ratio of copper to magnesium to iron is 1-3:0.5-2:0.5-2, preferably 1.2-2.8:0.6-1.8: 0.6-1.8, preferably 1.4-2.6:0.7-1.6:0.7-1.6, preferably 1.6-2.4:0.8-1.4:0.8-1.4, more preferably 1.8-2.2:0.9-1.2:0.9-1.2, and yet more preferably about 2:1:1 in the layered triple hydroxide material. In some embodiments, a weight ratio of the layered triple hydroxide material and the zeolitic imidazolate framework-67 (ZIF-67) in the nanocomposite material is from 1:10 to 10:1, preferably 1:9 to 9:1 preferably 1:8 to 8:1, preferably 1:7 to 7:1, preferably 1:6 to 6:1, preferably 1:5 to 5:1, preferably 1:4 to 4:1, preferably 1:3 to 3:1, more preferably 1:2 to 2:1, and yet more preferably about 1:1. In some embodiments, the layered triple hydroxide material is layered on the ZIF-67. In some other embodiments, the layered triple hydroxide material is integrated into the framework of the ZIF-67. ZIF-67 is composed of a tetrahedrally coordinated divalent cobalt metal ion and an imidazolate ligand. The ZIF-67 has a highly stable structure due to its cubic crystal symmetry and unit cell characteristics of a=b=c=16.9589 Å. In some embodiments, ZIF-67 material may be used in combination with other zinc-imidazolate materials such as, ZIF-1, ZIF-2, ZIF-3, ZIF-4, ZIF-5, ZIF-6, ZIF-7, ZIF-8, ZIF-9, ZIF-10, ZIF-11, ZIF-12, ZIF-14, ZIF-20, ZIF-21, ZIF-22, ZIF-23, ZIF-25, ZIF-60, ZIF-61, ZIF-62, ZIF-63, ZIF-64, ZIF-65, ZIF-66, ZIF-68, ZIF-69, ZIF-70, ZIF-71, ZIF-72, ZIF-73, ZIF-74, ZIF-75, ZIF-76, ZIF-77, ZIF-78, ZIF-79, ZIF-80, ZIF-81, ZIF-82, ZIF-90, ZIF-91, ZIF-92, ZIF-93, ZIF-94, ZIF-96, ZIF-97, ZIF-100, ZIF-108, ZIF-303, ZIF-360, ZIF-365, ZIF-376, ZIF-386, ZIF-408, ZIF-410, ZIF-412, ZIF-413, ZIF-414, ZIF-486, ZIF-516, ZIF-586, ZIF-615, ZIF-725, the like, and/or a combination thereof.

The imidazolate forms the organic ligand in the cobalt-imidazolate material. Imidazolate is the conjugate base of imidazole. Exemplary imidazole-based organic ligands include, but are not limited to, imidazole, 2-methylimidazole, 4-methylimidazole, 2-ethylimidazole, 2-isopropylimidazole, 4-tert-butyl-1H-imidazole, 2-ethyl-4-methylimidazole, 2-bromo-1H-imidazole, 4-bromo-1H-imidazole, 2-chloro-1H-imidazole, 2-iodoimidazole, 2-nitroimidazole, 4-nitroimidazole, (1H-imidazol-2-yl) methanol, 4-(hydroxymethyl) imidazole, 2-aminoimidazole, 4-(trifluoromethyl)-1H-imidazole, 4-cyanoimidazole, 3H-imidazole carboxylic acid, 4-imidazolecarboxylic acid, imidazole-2-carboxylic acid, 2-hydroxy-1H-imidazole-4-carboxylic acid, 4,5-imidazoledicarboxylic acid, 5-iodo-2-methyl-1H-imidazole, 2-methyl-4-nitroimidazole, 2-(aminomethyl) imidazole, 4,5-dicyanoimidazole, 4-imidazoleacetic acid, 4-methyl-5-imidazolemethanol, 1-(4-methyl-1H-imidazol-5-yl) methanamine, 4-imidazoleacrylic acid, 5-bromo-2-propyl-1H-imidazole, ethyl-(1H-imidazol-2-ylmethyl)-amine, 2-butyl-5-hydroxymethylimidazole, and the like.

The nanocomposite material is present in an amount of 0.01 to 1.5 percent by weight (wt. %), preferably 0.05 to 1.2 wt. %, more preferably 0.1 to 1.0 wt. %, and yet more preferably about 0.2 to 0.8 wt. % of the drilling fluid suspension.

At step 54, the method 50 includes circulating the drilling fluid suspension in the subterranean geological formation and forming a water-based mud. The drilling fluid suspension is injected with the nanocomposite material, prior to circulating the subterranean geological formation for at least 30 minutes, preferably for an hour, to form the water-based mud. Once the drilling fluid suspension is injected into the subterranean geological formation, it mixes with the subsurface fluid and circulates in the subterranean geological formation to form the water-based mud (WBM). In some embodiments a major portion, preferably at least 80 percent by volume (vol. %), at least 90 vol. %, or at least 95 vol. %, of the drilling fluid suspension injected into the subterranean geological formation remains in the borehole and is circulated only in the borehole without directly entering pores or cracks present in the subterranean geological formation. The purpose of injecting and circulating the nanocomposite material is: i) to prevent corrosion of metallic drilling equipment exposed to hydrogen sulfide during oil and gas drilling operations due to H$_2$S; ii) to remove the H$_2$S encountered during the drilling operation; and iii) and to prevent unwanted effects of H$_2$S in the drilling fluid suspension caused by exposure or contamination by H$_2$S. In one embodiment, the method 50 is to enhance the rheological properties of any drilling fluid, not limited to the drilling fluid suspension of the present disclosure, whereby the nanocomposite material is utilized.

At step 56, the method 50 includes scavenging the hydrogen sulfide from the subterranean geological formation by reacting the hydrogen sulfide with the nanocomposite material in the water-based mod. In some embodiments, the scavenging the hydrogen sulfide from the subterranean geological formation includes bonding the hydrogen sulfide to the nanocomposite material. In some embodiments, the concentration of the nanocomposite material may be adjusted according to the amount of hydrogen sulfide that may be encountered during the wellbore drilling. The hydrogen sulfide may be quenched with the nanocomposite material during the scavenging. In some embodiments, the hydrogen sulfide may be scavenged through uncoordinated open metal cobalt(II) and basic nitrogen sites in the ZIF-67 of the nanocomposite material. In some embodiments, the hydrogen sulfide may react with the nanocomposite material and may be converted into a stable and/or insoluble sulfide, such as a hydrosulfide and/or elemental sulfur.

At step 58, the method 50 optionally includes flowing hydrogen sulfide gas into the drilling fluid suspension to evaluate the hydrogen sulfide scavenging performance of the nanocomposite material. For this purpose, the $H_2S$ gas is seeded in methane at a concentration of 50 to 150 parts per million volumes (ppmv), preferably 60 to 140 ppmv, preferably 70 to 130 ppmv, preferably 80 to 120 ppmv, preferably 90 to 110 ppmv, more preferably 95 to 105 ppmv, and yet more preferably about 100 ppmv, with a balance to methane. The $H_2S$ gas is flowed at a rate of 50 to 150 mL/min, preferably 60 to 140 mL/min, preferably 70 to 130 mL/min, preferably 80 to 120 mL/min, preferably 90 to 110 mL/min, more preferably 95 to 105 mL/min, and yet more preferably about 100 mL/min.

In some embodiments, the drilling fluid suspension further includes a bentonite, a polysaccharide, a starch, a hydroxide, and a carbonate. The bentonite may refer to potassium bentonite, sodium bentonite, calcium bentonite, aluminum bentonite, and combinations thereof, depending on the relative amounts of potassium, sodium, calcium, and aluminum in the bentonite. The bentonite acts as a viscosifier. The viscosifier is an additive of the drilling fluid suspension that increases the viscosity of the drilling fluid suspension. In some embodiments, the bentonite may be substituted by other viscosifiers that may include, but are not limited to, sodium carbonate (soda ash), bauxite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, and halloysite. In some embodiments, the viscosifier may further include a natural polymer such as a hydroxyethyl cellulose (HEC) polymer, a carboxymethylcellulose (CMC) polymer, a polyanionic cellulose (PAC) polymer, and the like, or a synthetic polymer, such as poly(diallyl amine), diallyl ketone, diallyl amine, styryl sulfonate, vinyl lactam, laponite, polygorskites (such as attapulgite, sepiolite, and the like), a drilling polymer, a resonated polymer, a polyacrylate polymer, the like, and combinations thereof. A viscosifier may be used to increase a carrying capacity of the drilling fluid suspension.

The polysaccharide and starch act as a fluid loss prevention agent. The fluid loss prevention agent is an additive of the drilling fluid suspension that controls loss of the drilling fluid suspension when injected into the subterranean geological formation. In some embodiments, the drilling fluid suspension may include multiple fluid loss prevention agents depending on the customized need of a user. In some embodiments, the other fluid loss prevention agents, such as silica flour, gas bubbles (energized fluid or foam), benzoic acid, soaps, resin particulates, relative permeability modifiers, degradable gel particulates, hydrocarbons dispersed in fluid, one or more immiscible fluids, the like, and a combination thereof may be used as well. In some embodiments, the starch is a corn starch.

The hydroxide acts as a pH-adjusting agent, also referred to as a buffer. The pH-adjusting agent may include an alkali metal base. In some embodiments, the alkali metal base may include, but is not limited to, potassium hydroxide, lithium hydroxide, rubidium hydroxide, cesium hydroxide, and sodium hydroxide. In a preferred embodiment, the hydroxide is sodium hydroxide (caustic soda). In some embodiments, the pH-adjusting agent may include, but is not limited to, monosodium phosphate, disodium phosphate, sodium tripolyphosphate, and the like. In some embodiments, the pH of the drilling fluid suspension is acidic or neutral. In a preferred embodiment, the pH of the drilling fluid suspension is basic, with a pH ranging from 7 to 14, preferably 8 to 13, more preferably 9 to 12, and yet more preferably 10 to 11. The drilling fluid suspension has a pH of 10 or more. In some embodiments, The carbonate acts as a pH treatment source.

In some embodiments, the drilling fluid suspension further includes a barite as a weighting agent. The weighting agent is an agent that increases the overall density of the drilling fluid suspension to provide sufficient bottom-hole pressure to prevent an unwanted influx of formation fluids. The density of the drilling fluid includes all practical ranges and is not limited to 9 parts per gram (ppg). In some embodiments, the weighting agent may include but is not limited to, calcium carbonate, sodium sulfate, hematite, siderite, ilmenite, the like, and a combination thereof.

In some embodiments, the drilling fluid suspension may also include a deflocculant. Deflocculant is an additive of the drilling fluid suspension that prevents a colloid from coming out of suspension or slurries. In some embodiments, the deflocculant may include, but is not limited to, an anionic polyelectrolyte, for example, acrylates, polyphosphates, lignosulfonates (LS), or tannic acid derivatives, for example, quebracho, the like, and a combination thereof.

In some embodiments, the drilling fluid suspension may also include a lubricant. In some embodiments, LUBE 1017OB may be used as the lubricant. In some embodiments, the lubricant may include, but is not limited to, polyalpha-olefin (PAO), synthetic esters, polyalkylene glycols (PAG), phosphate esters, alkylated naphthalenes (AN), silicate esters, ionic fluids, multiply alkylated cyclopentanes (MAC), the like, and a combination thereof.

In some embodiments, the drilling fluid suspension may also include a crosslinker. The crosslinker is an additive of the drilling fluid suspension that can react with multiple-strand polymers to couple molecules together, thereby creating a highly viscous fluid, with a controllable viscosity. The crosslinker may include, but is not limited to, metallic salts, such as salts of aluminium, iron, boron, titanium, chromium, zirconium, and the like, and/or organic crosslinkers, such as polyethylene amides, formaldehyde, the like, and a combination thereof.

In some embodiments, the drilling fluid suspension may also include a breaker. The breaker is an additive of the drilling fluid suspension that provides a desired viscosity reduction in a specified period. The breaker may include, but is not limited to, oxidizing agents, such as sodium chlorites, sodium bromate, hypochlorites, perborate, persulfates, peroxides, enzymes, the like, and a combination thereof.

In some embodiments, the drilling fluid suspension may include a biocide. The biocide is an additive of the drilling fluid suspension that may kill microorganisms present in the drilling fluid suspension. The biocide may include, but is not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, 2,2-dibromo-3-nitrilopropionamide, and 2-bromo-2-nitro-1,3-propanedial, the like, and a combination thereof.

The drilling fluid suspension may also include a corrosion inhibiting agent. The corrosion inhibiting agent is a chemical compound that decreases the corrosion rate of a material, more preferably, a metal or an alloy, that meets the drilling fluid suspension. In some embodiments, the corrosion inhibiting agent may include, but is not limited to, imidazolines and amido amines. In some embodiments, the corrosion inhibiting agent may include, but is not limited to, oxides, sulfides, halides, nitrates, preferably halides, of metallic elements of group IIIa to Via, such as $SbBr_3$, the like, and a combination thereof.

The drilling fluid suspension may also include an anti-scaling agent. The anti-scaling agent is an additive of the drilling fluid suspension that inhibit the formation and precipitation of crystallized mineral salts that form scale. The anti-scaling agent may include, but is not limited to, phosphonates, acrylic co/ter-polymers, polyacrylic acid (PAA), phosphino poly carboxylic acid (PPCA), phosphate esters, hexamethylene diamine tetrakis (methylene phosphonic acid), diethylene triamine tetra (methylene phosphonic acid), diethylene triamine penta (methylene phosphonic acid) (DETA phosphonate), bis-hexamethylene triamine pentakis (methylene phosphonic acid) (BHMT phosphonate), 1-hydroxyethylidene 1,1-diphosphonate (HEDP phosphonate), polymers of sulfonic acid on a polycarboxylic acid backbone, and the like. In some embodiments, the anti-scaling agent may further include phosphine, sodium hexametaphosphate, sodium tripolyphosphate, other inorganic polyphosphates, hydroxy ethylidene diphosphonic acid, butane-tricarboxylic acid, phosphonates, itaconic acid, 3-allyloxy-2-hydroxy-propionic acid, and the like. In some embodiments, the drilling fluid suspension may include metal sulfide scale removal agents such as hydrochloric acid and the like.

In some embodiments, the drilling fluid suspension includes a gelling agent, such as gum Arabic. Certain other examples of gelling agents include a carbomer, a carrageenan, a chitosan, a gelatin, a pectin, a poloxamer, a poly(ethylene), a copolymer, such as poly(vinyl butyral-co-vinyl alcohol-co-vinyl acetate), and the like. The gelling agent may be used to impart viscosity and/or stabilize the drilling fluid suspension.

The drilling fluid suspension may also include a chelating agent. The chelating agent may include, but is not limited to, dimercaprol (2,3-dimercapto-1-propanol), diethylenetriaminepentaacetic acid (DTPA), hydroxyethylenediaminetriacetic acid (HEDTA), ethylenediaminetetraacetic acid (EDTA), and the like. The concentration of components of the drilling fluid suspension may be varied to impart desired characteristics of the drilling fluid suspension.

As used herein, the term "breakthrough time" refers to the time it took the outlet $H_2S$ concentration to reach 15 milligrams per cubic meter (mg m$^{-3}$). In some embodiments, a breakthrough time for the hydrogen sulfide in the presence of the drilling fluid suspension is 25 to 35 times greater, preferably 27 to 32 times greater, more preferably 29 to 30 times greater, and yet more preferably about 29.31 times greater compared to a breakthrough time for the hydrogen sulfide in the presence of the drilling fluid suspension without the nanocomposite material.

As used herein, the term "saturation time" refers to the time it took the outlet $H_2S$ concentration to reach 99 to 105 parts per million volume (ppmv), preferably 100 to 104 ppm. In some embodiments, a saturation time for the hydrogen sulfide in the presence of the drilling fluid suspension is 2 to 8 times greater, preferably 3 to 6 times greater, more preferably 4 to 5 times greater, and yet more preferably about 4.7 times greater compared to a saturation time for the hydrogen sulfide in the presence of the drilling fluid suspension without the nanocomposite material.

As used herein, the term "breakthrough capacity" refers to the amount of $H_2S$ adsorbed by the material during the breakthrough period. In some embodiments, a breakthrough capacity for the hydrogen sulfide in the presence of the drilling fluid suspension is at least 25 to 35 times greater, preferably 27 to 32 times greater, more preferably 28 to 30 times greater, and yet more preferably about 28.92 times greater than a breakthrough capacity for the hydrogen sulfide in the presence of the drilling fluid suspension without the nanocomposite material.

As used herein, the term "saturation capacity" refers to the amount of $H_2S$ adsorbed by the material during the saturation period. In some embodiments, a saturation capacity for the hydrogen sulfide in the presence of the drilling fluid suspension is at least 5 to 10 times greater, preferably 6 to 9 times greater, more preferably 6 to 7 times greater, and yet more preferably about 6.74 times greater than a saturation capacity for the hydrogen sulfide in the presence of the drilling fluid suspension without the nanocomposite material.

As used herein, the term "plastic viscosity" refers to the difference between the dial readings from a viscometer recorded at 600 rpm and 300 rpm. In some embodiments, the plastic viscosity of the drilling fluid suspension is 1 to 2 times greater, preferably 1.2 to 1.8 times greater, more preferably 1.4 to 1.6 times greater, and yet more preferably about 1.5 times greater compared to the plastic viscosity of the drilling fluid suspension without the nanocomposite material.

As used herein, the term "apparent viscosity" refers to the Bingham model where the value is one-half of the dial reading from a viscometer at 600 rpm of shear stress [Onaizi, S. A., Gawish, M. A., Murtaza, M., Gomaa, I., Tariq, Z., Mahmoud, M., $H_2S$ scavenging capacity and rheological properties of water-based drilling muds, *ACS Omega*, 2020, 5, 30729-30739]. In some embodiments, an apparent viscosity of the drilling fluid suspension is 1 to 2.5 times greater, preferably 1.5 to 2.2 times greater, more preferably 1.9 to 2.1 times greater, and yet more preferably about 2.08 times greater compared to an apparent viscosity of the drilling fluid suspension without the nanocomposite material.

In some embodiments, the yield point of the drilling fluid suspension is 1 to 4 times greater, preferably 2 to 3.7 times greater, more preferably 2.5 to 3.5 times greater, and yet more preferably about 3 times greater compared to the yield point of the drilling fluid suspension without the nanocomposite material.

In some embodiments, the carrying capacity of the drilling fluid suspension is 1 to 2 times greater, preferably 1.5 to 1.9 times greater, more preferably 1.6 to 1.8 times greater, and yet more preferably about 1.7 times greater compared to the carrying capacity of the drilling fluid suspension without the nanocomposite material.

In some embodiments, the fluid loss of the drilling fluid suspension is 1 to 1.2 times greater, preferably 1.05 to 1.15 times greater, more preferably 1.08 to 1.13 times greater, and yet more preferably about 1.11 times greater compared to the fluid loss of the drilling fluid suspension without the nanocomposite material.

In some embodiments, the gel strength of the drilling fluid suspension at a time of 10 seconds is 1 to 8 times greater, preferably 3 to 7 times greater, more preferably 5 to 6 times greater, and yet more preferably about 5.49 times greater compared to a gel strength of the drilling fluid suspension without the nanocomposite material at a time of 10 seconds.

In some embodiments, the gel strength of the drilling fluid suspension at a time of 10 minutes is 1.1 to 6 times greater, preferably 3 to 5.5 times greater, more preferably 4 to 5 times greater, and yet more preferably about 4.9 times greater compared to the gel strength of the drilling fluid suspension without the nanocomposite material at a time of 10 minutes.

In some embodiments, the drilling fluid suspension has a density of 2 to 20 parts per gram (ppg), preferably 4 to 16 ppg, preferably 6 to 12 ppg, more preferably 8 to 10 ppg, and yet more preferably about 9 ppg.

Figure 1B:
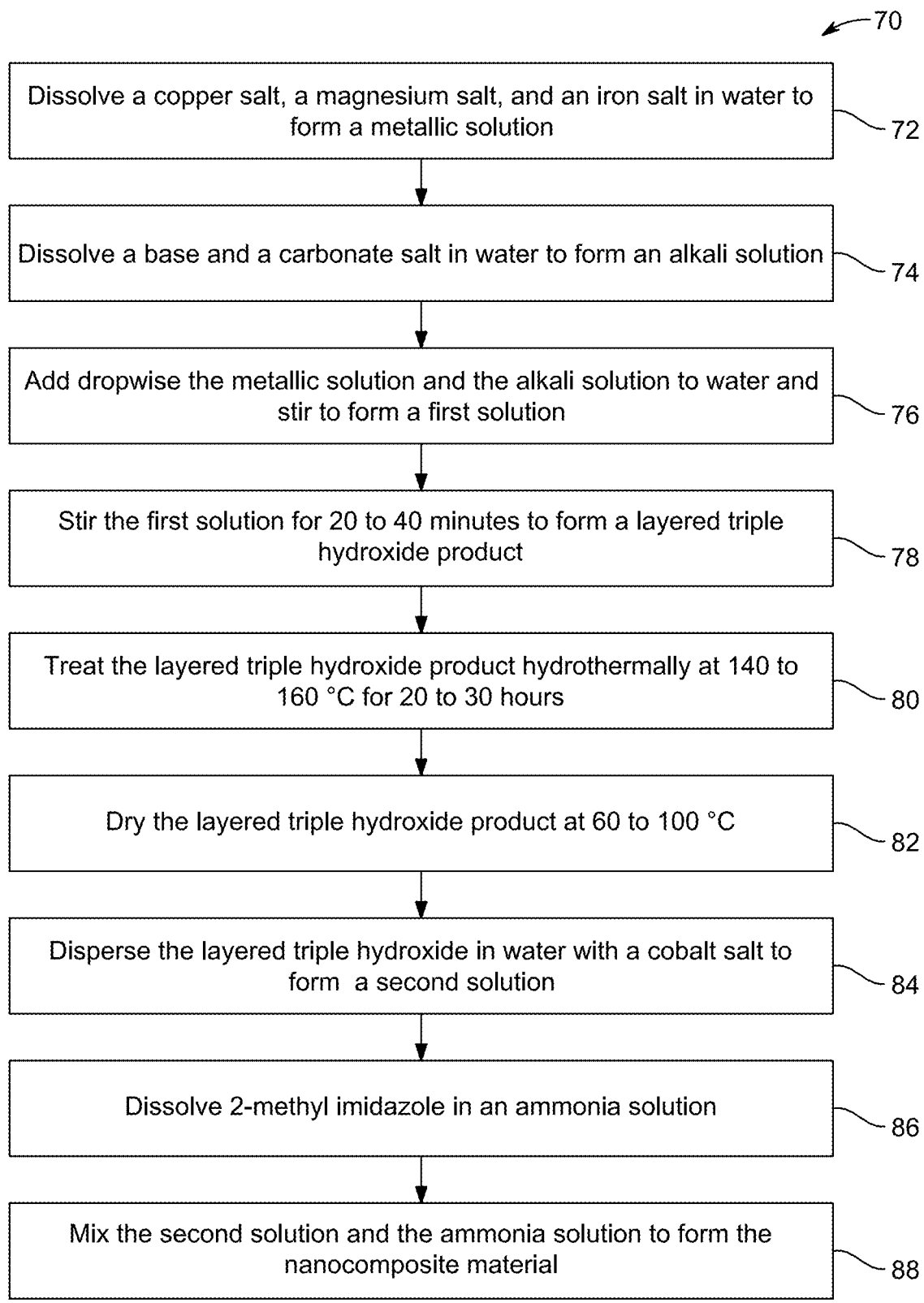
FIG. 1B is a flowchart illustrating a method of making a nanocomposite material, according to certain embodiments.

FIG. 1B illustrates a flow chart of a method 70 of making the nanocomposite material. The nanocomposite material can be synthesized by any other method of synthesis including but not limited to co-precipitation, hydrothermal methods, solvothermal method, and/or sol-gel method. The order in which the method 70 is described is not intended to be construed as a limitation, and any number of the described method steps can be combined in any order to implement the method 70. Additionally, individual steps may be removed or skipped from the method 70 without departing from the spirit and scope of the present disclosure.

At step 72, the method 70 includes dissolving a copper salt, a magnesium salt, and an iron salt in water to form a metallic solution. In some embodiments, the copper salt may include, but is not limited to, copper sulfate, copper chloride, copper hydroxide, copper nitrate, copper oxide, copper acetate, copper fluoride, copper bromide, copper carbonate, copper carbonate hydroxide, copper chlorate, copper arsenate, copper azide, copper acetylacetonate, copper aspirinate, copper cyanurate, copper glycinate, copper phosphate, copper perchlorate, copper selenite, copper sulfide, copper triflate, copper thiocyanate, copper tetrafluoroborate, copper acetate triarsenite, copper benzoate, copper arsenite, copper chromite, copper gluconate, copper peroxide, copper usnate, copper oxychloride, and the like. In some embodiments, the copper salt is a copper hydrate salt. In some embodiments, the copper salt is $Cu(NO_3)_2 \cdot 6H_2O$. Suitable examples of magnesium salts include, but are not limited to, magnesium acetate, magnesium carbonate, magnesium chloride, magnesium tetroxide, magnesium dioxide, potassium permanganate, magnesium gluconate, magnesium oxide. In some embodiments, the magnesium salt is a magnesium hydrate salt. In some embodiments, the magnesium salt is $Mg(NO_3)_2 \cdot 6H_2O$. Suitable examples of iron salts include, but are not limited to, iron acetate, iron bromide, iron carbonate, iron chloride, iron chromite, iron citrate, iron cyanide, iron fluoride, iron fumarate, iron gluconate, iron hydride, iron hydroxide, iron iodide, iron lactate, iron molybdate, iron nitrate, iron oxalate, and the like. In some embodiments, the iron salt is an iron hydrate salt. In some embodiments, the iron salt is $Fe(NO_3)_3 \cdot 9H_2O$. In some embodiments, the molar ratio of iron salt to magnesium salt is in the range of 5:1 to 1:5, preferably 4:1 to 1:4, preferably 3:1 to 1:3, more preferably 2:1 to 1:2, and yet more preferably about 1:1. In some embodiments, the molar ratio of copper salt to magnesium salt is in the range of 5:1 to 1:5, preferably 4:1 to 1:4, preferably 3:1 to 1:3, more preferably 2:1 to 1:2, and yet more preferably about 2:1. In some embodiments, the molar ratio of copper salt to iron salt is in the range of 5:1 to 1:5, preferably 4:1 to 1:4, preferably 3:1 to 1:3, more preferably 2:1 to 1:2, and yet more preferably about 2:1.

At step 74, the method 70 includes dissolving a base and a carbonate salt in water to form an alkali solution. The base may be selected from the group consisting of an alkaline earth metal hydroxide, such as beryllium hydroxide (Be(OH)$_2$), magnesium hydroxide (Mg(OH)$_2$), strontium hydroxide (Sr(OH)$_2$), and calcium hydroxide (Ca(OH)$_2$), and an alkali metal hydroxide, such as lithium hydroxide (LiOH), sodium hydroxide (NaOH), potassium hydroxide (KOH) and rubidium hydroxide (RbOH), and cesium hydroxide (CsOH), and the like. In some embodiments, the inorganic base is at least one of potassium carbonate and sodium carbonate. In a preferred embodiment, the base is NaOH. Examples of the carbonate salt include, but are not limited to ammonium bicarbonate, barium carbonate, calcium carbonate, magnesite, sodium percarbonates, sodium carbonate, sodium bicarbonate. In a preferred embodiment, the carbonate salt is sodium carbonate.

At step 76, the method 70 includes adding dropwise the metallic solution and the alkali solution to water and stirring to form a first solution. In some embodiments, the pH of the first solution is between 9 and 11, preferably about 10. In some embodiments, addition can be done by any method used or known in the art.

At step 78, the method 70 includes stirring the first solution for 20 to 40 minutes, preferably 25 to 35 minutes, more preferably 28 to 32 minutes, and yet more preferably about 30 minutes, to form a layered triple hydroxide product. In some embodiments, other modes of stirring known to those of ordinary skill in the art, for example, via swirling, mixing, centrifuged, or a combination thereof, may be employed.

At step 80, the method 70 includes treating the layered triple hydroxide product hydrothermally at 140 to 160° C., preferably 142 to 158° C., more preferably 145° C. to 155° C., and yet more preferably about 150° C. for 20 to 30 hours, preferably 21 to 27 hours, more preferably 23 to 25 hours, and yet more preferably about 24 hours.

At step 82, the method 70 includes drying the layered triple hydroxide product at 60 to 100° C., preferably 70 to 90° C., more preferably 75 to 85° C., and yet more preferably about 80° C. In some embodiments, the drying can be performed by using heating appliances such as ovens, microwaves, autoclaves, hot plates, heating mantles and tapes, oil baths, salt baths, sand baths, air baths, hot-tube furnaces, and hot-air guns.

At step 84, the method 70 includes dispersing the layered triple hydroxide in water with a cobalt salt to form a second solution. In some embodiments, dispersion can be done by methods such as mixing, mechanical dispersion, electrical dispersion, peptization, ultrasonic waves, and the like.

At step 86, the method 70 includes dissolving 2-methyl imidazole in an ammonia solution.

At step 88, the method 70 includes mixing the second solution and the ammonia solution to form the nanocomposite material. In some embodiments, the mixing can be done by stirring, swirling, sonicating, or a combination thereof may be employed to form the nanocomposite material. In some embodiments, a dispersion agent is utilized to enhance the dispersion of the nanocomposite material.

In the present disclosure the method 50 for removing hydrogen sulfide from aqueous drilling fluids during oil/gas wells drilling is disclosed. The method 50 also prevents metallic corrosion that results from exposure to $H_2S$. The method provides an effective means of removing hydrogen sulfide from water-based drilling fluids while maintaining the integrity of metallic structures during subterranean drilling operations. In some embodiments, the nanocomposite material is utilized for $H_2S$ removal in aqueous systems other than water-drilling mud, which include but is not limited to the removal of $H_2S$ from water injection systems, produced water from an oilfield, and hydrogen sulfide present in mixed production streams. The nanocomposite material is insoluble, chemically, and thermally stable under aqueous systems. The nanocomposite material is easily dispersible. The method 50 and the nanocomposite material may also be used to remove hydrogen sulfide from gaseous streams containing hydrogen sulfide.

EXAMPLES

The following examples demonstrate a method of removing hydrogen sulfide ($H_2S$) from a subterranean geological formation. The examples are provided solely for illustration and are not to be construed as limitations of the present disclosure, as many variations thereof are possible without departing from the spirit and scope of the present disclosure.

Example 1: Fabrication of CuMgFe-LTH/ZIF-67 Nanocomposite

Figure 3:
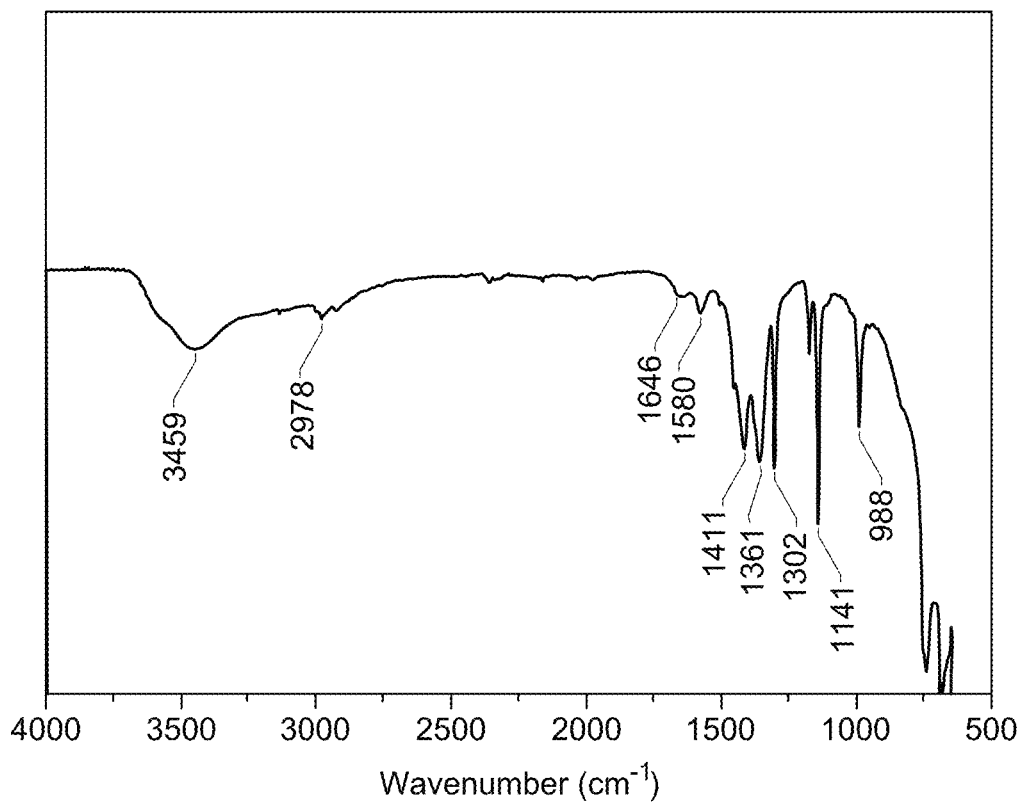
FIG. 3 depicts a Fourier-transform infrared (FTIR) spectrum of the nanocomposite material, according to certain embodiments.
Figure 4:
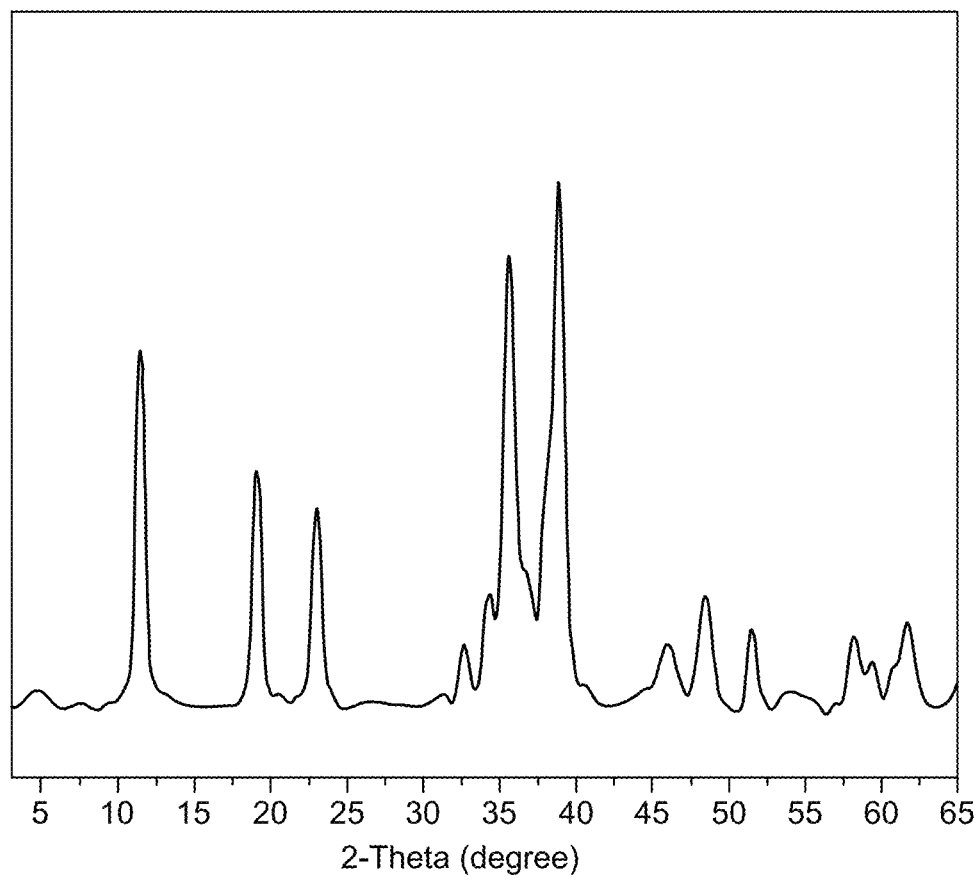
FIG. 4 depicts X-ray diffraction (XRD) pattern of the nanocomposite material, according to certain embodiments.
Figure 5:
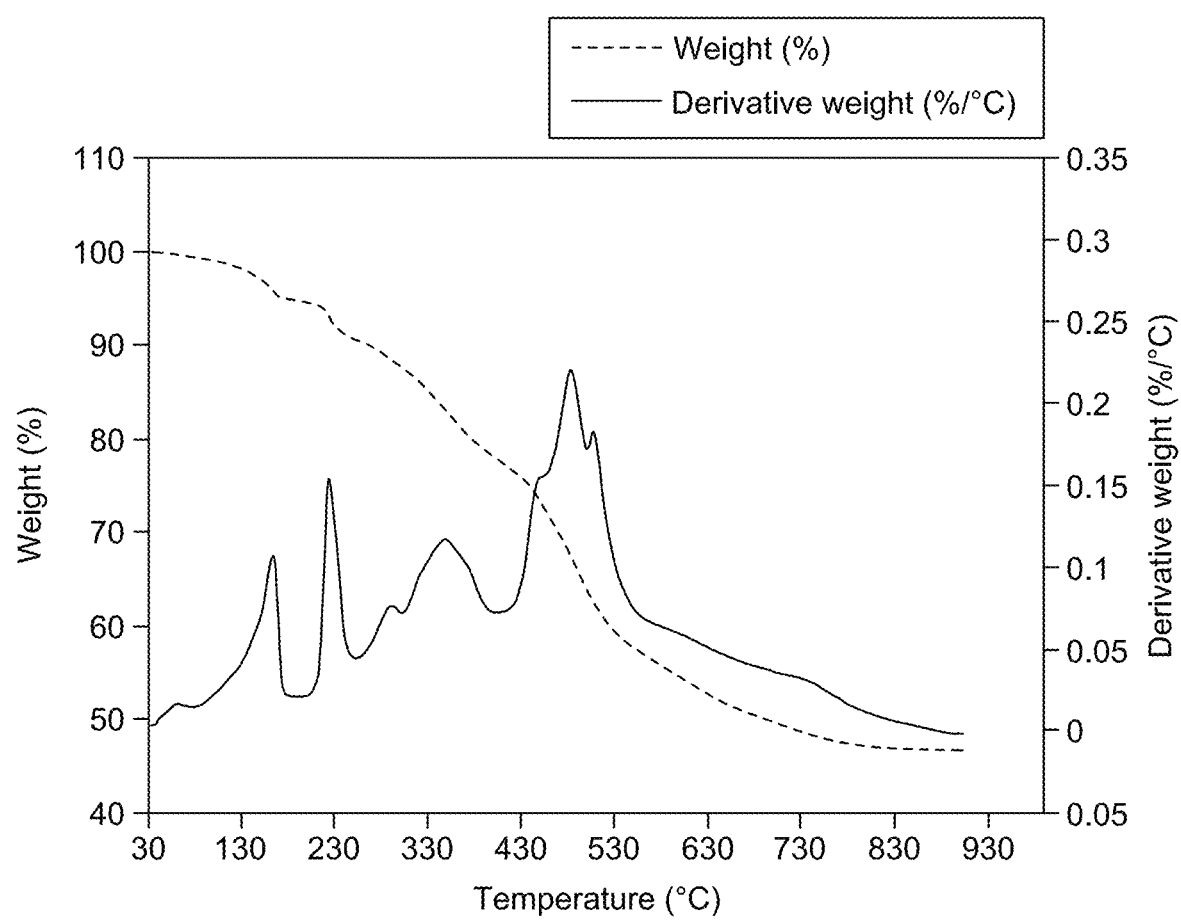
FIG. 5 depicts thermal stability of the nanocomposite material measured using thermogravimetric analysis (TGA), according to certain embodiments.

A known mass of CuMgFe-LTH was first prepared and dispersed in a cobalt solution during a ZIF-67 preparation. Firstly, the CuMgFe-LTH was synthesized by co-precipitation followed by hydrothermal treatment at 150° C. A 150 mL metallic solution containing 12.70 millimoles (mmol) of $Cu(NO_3)_2 \cdot 6H_2O$, 6.35 mmol of $Mg(NO_3)_2 \cdot 6H_2O$, and 6.35 mmol of $Fe(NO_3)_2 \cdot 9H_2O$) was prepared in a volumetric flask. A 150 mL alkali solution containing 50.78 mmol of NaOH and 3.18 mmol of $Na_2CO_3$ was prepared in a separate volumetric flask. The molar ratios of $Cu^{2+}/Mg^{2+}$ and $(Cu^{2+}+Mg^{2+})/Fe^{3+}$ were maintained at 2/1 and 3/1, respectively. The two solutions were slowly added dropwise simultaneously into a beaker containing 100 milliliters (mL) of distilled water, initially at a pH of 10, while continuously stirring with the aid of a magnetic stirrer. The pH of the mixture in the beaker was maintained between pH 9.5 and 11 during the addition of the metal and alkali solutions. After the complete addition of the above solutions, the reaction mixture was left to stir at room temperature for 30 minutes (min) to aid in the formation of the triple hydroxide layers. The resulting product was transferred into an autoclave reactor for hydrothermal treatment at 150° C. for 24 hours (h). The CuMgFe-LTH was centrifuged and dried in an oven at 80° C. Further, a known mass of dried CuMgFe-LTH was dispersed in a $Co(NO_3)_2 \cdot 6H_2O$ solution. In a separate beaker, 2-methyl imidazole and $NH_4OH$ are mixed to obtain a second solution. The imidazole-containing solution was added to the CuMgFe-LTH cobalt salt solution and stirred for 1 hour. The mixture was left to stand for 1 hour and centrifuged. The obtained product (CuMgFe-LTH/ZIF-67) was dried in an oven at 50° C. A Fourier-transform infrared (FTIR) spectrum of the nanocomposite material is shown in FIG. 3. An X-ray diffraction (XRD) pattern of the nanocomposite material is shown in FIG. 4. The thermal stability of the nanocomposite material measured using thermogravimetric analysis (TGA) is shown in FIG. 5.

Figure 2:
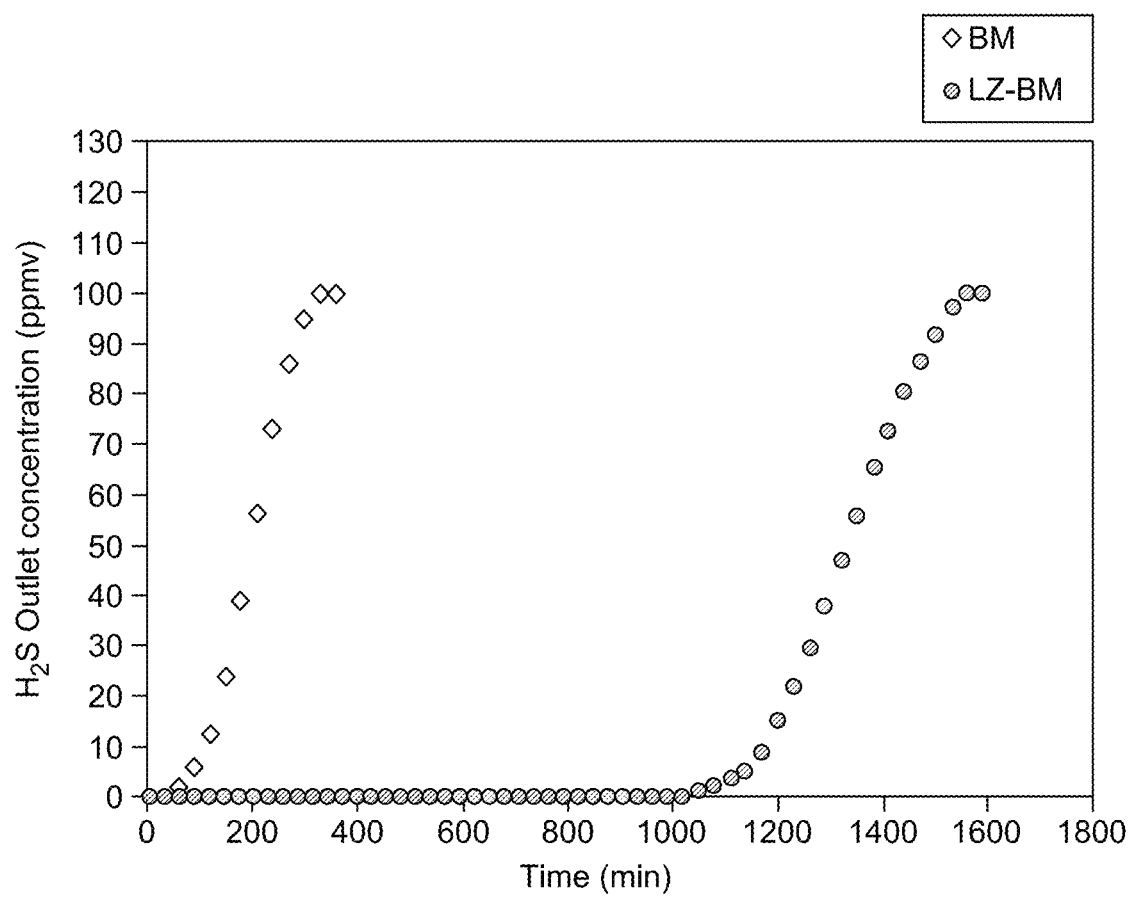
FIG. 2 is a graph depicting $H_2S$ scavenging capacity of the drilling fluid with and without the nanocomposite material in parts per million volume (ppmv) per unit of time, according to certain embodiments.

Example 2: Ability of the Scavenger to Remove $H_2S$ During Oil/Gas Well Drilling In a continuous setup with a bubble column, flowmeter, and $H_2S$ detector, the scavenging capacities at breakthrough (i.e., when $H_2S$ was first detected in the outlet gas stream) and at saturation of the aqueous drilling fluid without the scavenger and the aqueous drilling fluid with the added scavenger, were determined. The 9.0 parts per gram (ppg) water-based drilling mud was formulated in accordance with Table 1, and the pH was adjusted between 11-11.50. Each component is specifically selected as per their intrinsic properties and advantages to the rheology of the aqueous drilling fluid. The scavenger-based drilling mud was formulated with the addition of 1 weight percentage (wt. %) of CuMgFe-LTH/ZIF-67, alternatively referred to as LZ-BM without any limitations. 10.0 g of each formulated drilling fluid was collected into the bubble column for $H_2S$ scavenging capacity measurement. A steady, continuous gaseous source of 100 ppmv $H_2S$ (in methane) flowing at 100 mL/min was utilized for these tests, and the results are further illustrated in FIG. 2.

TABLE 1

| Additives | Quantities |
| --- | --- |
| Distilled Water | 350.0 mL |
| Bentonite | 20.0 g |
| Xanthan Gum | 0.4 g |
| Starch | 10.0 g |
| Potassium Hydroxide | 0.5 g |
| Calcium Carbonate | 30.0 g |

Example 3: Effect of the Scavenger on Rheological Characteristics of Drilling Fluids The rheological characteristics of aqueous drilling fluids at varying concentrations were examined. The rheological measurements were conducted using a Model 3600 Grace Viscometer (Grace Instruments, Texas, USA), at a temperature of 120° F. and ambient pressure. The results of the test revealed that the utilization of the presented scavenger does not have any deleterious impacts on the rheological properties of the water-based mud. Notably, the results indicate that the scavenger may be employed to enhance the apparent viscosity (AV), yield point (YP), and gel strengths (GS) of the aqueous drilling fluids. The results of these tests are presented in Table 2 and Table 3. The H: S scavenging performance of the LZ-BM benchmarked against the base mud without any scavenger is presented in Table 4.

TABLE 2

| | Rheological parameters | | | | | |
| --- | --- | --- | --- | --- | --- | --- |
| Scavenger conc. (wt. %) | AV (cP) | YP (lb/100 ft$^2$) | PV (cP) | Carrying capacity YP/PV | GS (10 s) (lb/100 ft$^2$) | GS (10 min) (lb/100 ft$^2$) |
| BM | 25.15 | 13.7 | 18.3 | 0.75 | 6.45 | 16.63 |
| 0.05 | 26.22 | 14.68 | 18.88 | 0.78 | 7.24 | 20.15 |
| 0.25 | 28.77 | 16.24 | 20.65 | 0.79 | 7.63 | 28.37 |
| 0.5 | 38.65 | 25.83 | 25.73 | 1 | 15.65 | 50.88 |
| 0.75 | 43.15 | 32.09 | 27.1 | 1.18 | 21.91 | 55.96 |
| 1 | 52.54 | 41.1 | 32 | 1.28 | 35.42 | 81.6 |

TABLE 3

| Drilling fluid | Fluid loss (mL) | FL Cake Thickness (mm) |
|---|---|---|
| BM | 12.2 | 2.38 |
| LZ-BM | 13.6 | 2.38 |

TABLE 4

| Drilling fluid | Breakthrough Time (min) | Breakthrough Capacity (mg/L) | Saturation time (min) | Saturation Capacity (mg/L) |
|---|---|---|---|---|
| BM | 34.5 | 52.3 | 325 | 294.6 |
| LZ-BM | 1011.5 | 1513.3 | 1554.5 | 1986.2 |
|  |  | 140.8$^a$ |  | 184.8$^a$ |

$^a$mg $H_2S$/g of scavenger

Note:
LZ-BM is the water-based mud (BM) formulation with 1.0 wt. % of the presented scavenger.

Numerous modifications and variations of the present disclosure are possible in light of the above teachings. Therefore, it is to be understood that within the scope of the appended claims, the disclosure may be practiced other than as specifically described herein.

The invention claimed is:

1. A method of removing hydrogen sulfide from a subterranean geological formation, comprising:
    injecting a drilling fluid suspension into the subterranean geological formation,
    wherein the drilling fluid suspension comprises a nanocomposite material comprising a layered triple hydroxide material comprising copper, magnesium, and iron, and a zeolitic imidazolate framework-67,
    wherein the drilling fluid suspension has a pH of 10 or more,
    wherein the nanocomposite material is present in an amount of 0.01 to 1.5 percent by weight of the drilling fluid suspension,
    circulating the drilling fluid suspension in the subterranean geological formation and forming a water-based mud; and
    scavenging the hydrogen sulfide from the subterranean geological formation by reacting the hydrogen sulfide with the nanocomposite material in the water-based mud.

2. The method of claim 1, wherein a molar ratio of copper to magnesium to iron is 1-3:0.5-2:0.5-2 in the layered triple hydroxide material.

3. The method of claim 1, wherein the drilling fluid suspension further comprises a bentonite, a polysaccharide, a starch, a hydroxide, and a carbonate.

4. The method of claim 1, wherein a breakthrough time for the hydrogen sulfide in the presence of the drilling fluid suspension is 25 to 35 times greater compared to a breakthrough time for the hydrogen sulfide in the presence of the drilling fluid suspension without the nanocomposite material.

5. The method of claim 1, wherein a saturation time for the hydrogen sulfide in the presence of the drilling fluid suspension is 2 to 8 times greater compared to a saturation time for the hydrogen sulfide in the presence of the drilling fluid suspension without the nanocomposite material.

6. The method of claim 1, wherein a breakthrough capacity for the hydrogen sulfide in the presence of the drilling fluid suspension is at least 25 to 35 times greater than a breakthrough capacity for the hydrogen sulfide in the presence of the drilling fluid suspension without the nanocomposite material.

7. The method of claim 1, wherein a saturation capacity for the hydrogen sulfide in the presence of the drilling fluid suspension is at least 5 to 10 times greater than a saturation capacity for the hydrogen sulfide in the presence of the drilling fluid suspension without the nanocomposite material.

8. The method of claim 1, wherein a plastic viscosity of the drilling fluid suspension is 1 to 2 times greater compared to a plastic viscosity of the drilling fluid suspension without the nanocomposite material.

9. The method of claim 1, wherein an apparent viscosity of the drilling fluid suspension is 1 to 2.5 times greater compared to an apparent viscosity of the drilling fluid suspension without the nanocomposite material.

10. The method of claim 1, wherein a yield point of the drilling fluid suspension is 1 to 4 times greater compared to a yield point of the drilling fluid suspension without the nanocomposite material.

11. The method of claim 1, wherein a carrying capacity of the drilling fluid suspension is 1 to 2 times greater compared to a carrying capacity of the drilling fluid suspension without the nanocomposite material.

12. The method of claim 1, wherein a fluid loss of the drilling fluid suspension is 1 to 1.2 times greater compared to a fluid loss of the drilling fluid suspension without the nanocomposite material.

13. The method of claim 1, wherein a gel strength of the drilling fluid suspension at a time of 10 seconds is 1 to 8 times greater compared to a yield point of the drilling fluid suspension without the nanocomposite material at a time of 10 seconds.

14. The method of claim 1, wherein a gel strength of the drilling fluid suspension at a time of 10 minutes is 1.1 to 6 times greater compared to a yield point of the drilling fluid suspension without the nanocomposite material at a time of 10 minutes.

15. The method of claim 1, wherein the drilling fluid suspension has a density of 2 to 20 parts per gram (ppg).

16. The method of claim 1, wherein the nanocomposite material is made by a process, comprising:
    dissolving a copper salt, a magnesium salt, and an iron salt in water to form a metallic solution;
    dissolving a base and a carbonate salt in water to form an alkali solution;
    adding dropwise the metallic solution and the alkali solution to water and stirring to form a first solution;
    stirring the first solution for 20 to 40 minutes to form a layered triple hydroxide product;
    treating the layered triple hydroxide product hydrothermally at 140 to 160° C. for 20 to 30 hours;
    drying the layered triple hydroxide product at 60 to 100° C.;
    dispersing the layered triple hydroxide in water with a cobalt salt to form a second solution;
    dissolving 2-methyl imidazole in an ammonia solution; and
    mixing the second solution and the ammonia solution to form the nanocomposite material.

17. The method of claim 1, wherein a weight ratio of the layered triple hydroxide material and the zeolitic imidazolate framework-67 in the nanocomposite material is from 1:10 to 10:1.

18. The method of claim 1, wherein the scavenging the hydrogen sulfide from the subterranean geological formation includes bonding the hydrogen sulfide to the nanocomposite material.

19. The method of claim 1, further comprising flowing hydrogen sulfide gas into the drilling fluid suspension.

20. The method of claim 19, wherein flowing hydrogen sulfide gas into the drilling fluid suspension occurs at a rate of 50 to 150 mL/minute.

\* \* \* \* \*